Sept. 9, 1924.
H. H. MOSIER
SPOKE CONNECTION
Filed May 19, 1923
1,507,615
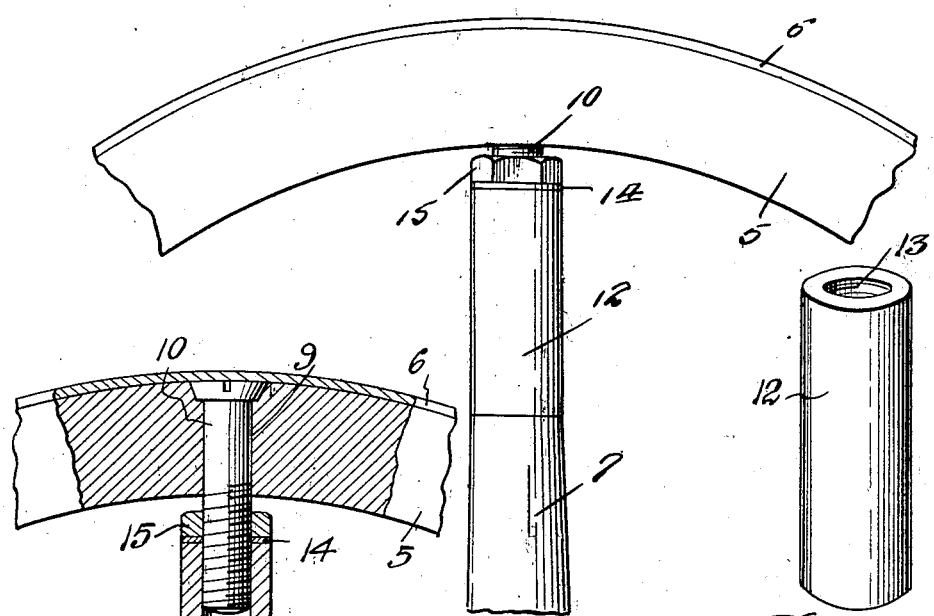
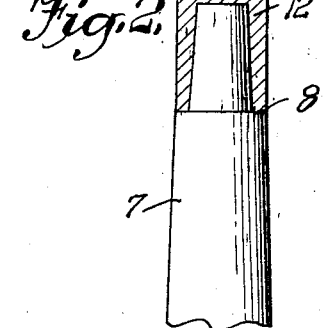
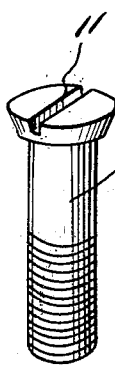
H. H. Mosier,
Inventor
Attorney Patented Sept. 9, 1924.

1,507,615

UNITED STATES PATENT OFFICE.

HORACE H. MOSIER, OF BRISTOL, INDIANA.

SPOKE CONNECTION.

Application filed May 19, 1923. Serial No. 639,994.

*To all whom it may concern:*

Be it known that I, HORACE H. MOSIER, a citizen of the United States, residing at Bristol, in the county of Elkhart and State of Indiana, have invented certain new and useful Improvements in Spoke Connections of which the following is a specification.

In carrying out the present invention, it is my purpose to provide an adjustable spoke for the wheels of vehicles, wherein compression may be provided between the rim and hub of the wheel.

The primary object of the invention is the provision of such an adjustable spoke, wherein the rigidity and life of the wheel will be materially increased, the invention being characterized by its simplicity of construction and inexpensiveness of manufacture, and one that will embrace at the same time, the desired features of efficiency and durability.

The nature and advantages of the invention will be better understood when the following detailed description is read in connection with the accompanying drawings, the invention residing in the construction combination, and arrangement of parts as claimed.

In the drawings forming part of this application, like numerals of reference indicate similar parts in the several views, and wherein:

Figure 1 is a fragmentary side elevation of a vehicle wheel equipped with my spoke.

Figure 2 is a detail cross section thereof, and

Figures 3 and 4 are perspectives of certain elements comprised in my invention.

Referring to the drawings, 5 indicates the wooden rim or felly of a vehicle wheel, 6 the usual metal band in position upon the rim or felly, and 7 one of the wheel spokes. In the furtherance of my invention, the upper end of the spoke 7 is reduced in diameter for providing a circular shoulder 8 adjacent the upper end thereof. The rim or felly 5 in direct alinement with the spoke is provided with a vertical bore 9, into which is engaged a headed and screw threaded bolt 10, it being noted that the head of this bolt is provided with a cross slot 11 for obvious purposes, and that this head is countersunk into the rim or felly 5. It will be of course necessary that the metal band 6 be removed from the wheel to enable the bolts 10 to be positioned within their openings.

Positioned over the reduced end of the said spoke 7 is the lower socketed end of a rod section 12, this bar section being circular in cross section, and of a diameter equivalent to the diameter of the adjacent portion of the spoke 7, it being noted that the lower end of this rod section rests upon the shoulder 8 of the spoke formed by the reduced portion. The upper end of the member 12 is formed with a screw threaded socket 13, into which is engaged the screw threaded end of the bolt 10, this engagement being occasioned through the turning of the bolt within the rim or felly before the band 6 has been again applied to the wheel. Upon the top side of the rod section 7 and separated therefrom by a washer 14, is a jam nut 15 that engages over said bolt 10, and in view of the above description, it will at once be apparent that when the wheel is assembled as in Figures 1 and 2, the jam nut 15 may be released for permitting of a turning movement to the rod section 12, through the medium of any suitable form of tool for consequently adjusting the wheel hub and rim or felly with respect to each other. As soon as the proper adjustment has been obtained, the jam nut 15 is turned downwardly upon the upper end of the rod section.

I have shown my spoke as associated with wheels including a wooden felly, it being of course understood that this form of spoke may be advantageously employed in connection with wheels wherein the outer rims or fellies are of steel or other metal. In this connection it is necessary that the rims or fellies be properly punched to receive the spokes.

Numerous advantages of a spoke of this character will be readily appreciated by those skilled in the art, and although I have herein shown and described the preferred embodiment of the present invention, it is nevertheless to be understood that minor changes may be made therein, without departing from the spirit and scope of the invention as claimed.

Having thus described my invention, what I claim as new, and desire to secure by Letters Patent, is:

A wheel comprising a felly and having a spoke spaced from the felly, there being provided in the felly an opening passing transversely therethrough and alined with the spoke, a socket member mounted upon the spoke and interposed between the end of the spoke and the felly, a bolt received in the opening of the felly and having its outer end flush with the periphery of the felly, the inner end of the bolt being threaded and being received in the socket member, a jamb nut threaded upon the bolt and disposed between the socket member and the felly, and a tire rim surrounding the felly and disposed over the outer end of the bolt.

In testimony whereof I affix my signature.

HORACE H. MOSIER.